United States Patent
Lu et al.

(10) Patent No.: US 12,067,240 B2
(45) Date of Patent: Aug. 20, 2024

(54) FLASH MEMORY SCHEME CAPABLE OF AUTOMATICALLY GENERATING OR REMOVING DUMMY DATA PORTION OF FULL PAGE DATA BY USING FLASH MEMORY DEVICE

(71) Applicant: Silicon Motion, Inc., Hsinchu County (TW)

(72) Inventors: Tsu-Han Lu, Hsinchu (TW); Hsiao-Chang Yen, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 64 days.

(21) Appl. No.: 17/956,855

(22) Filed: Sep. 30, 2022

(65) Prior Publication Data
US 2024/0111417 A1 Apr. 4, 2024

(51) Int. Cl.
G06F 3/06 (2006.01)

(52) U.S. Cl.
CPC ............ *G06F 3/061* (2013.01); *G06F 3/0658* (2013.01); *G06F 3/0659* (2013.01); *G06F 3/0679* (2013.01)

(58) Field of Classification Search
CPC ...... G06F 3/061; G06F 3/0658; G06F 3/0659; G06F 3/0679
See application file for complete search history.

(56) References Cited

U.S. PATENT DOCUMENTS

| | | |
|---|---|---|
| 2013/0124888 A1 | 5/2013 | Tanaka |
| 2018/0067691 A1* | 3/2018 | Zhou .................... G06F 3/0619 |

FOREIGN PATENT DOCUMENTS

| | | |
|---|---|---|
| CN | 101398785 A | 4/2009 |
| TW | 200849276 | 12/2008 |
| TW | I677873 B | 11/2019 |

* cited by examiner

*Primary Examiner* — Gurtej Bansal
(74) *Attorney, Agent, or Firm* — Winston Hsu

(57) ABSTRACT

A method of a flash memory controller includes: controlling an I/O circuit using a set-feature signal, which carries a set-feature command, feature address, and parameter information, and transmitting the set-feature signal to a flash memory device; the feature address corresponds to a valid data portion or a dummy data portion following the valid data portion, and both the valid data potion and dummy data portion are comprised in a full page data which is to be written into a physical page unit of the flash memory device or to be read out from the physical page unit; the corresponding parameter information is used to record the valid data portion's column address and data length, the dummy data portion's column address and data length, the dummy data portion's column address and the valid data portion's column address, or the dummy data portion's data length and the valid data portion's data length.

10 Claims, 9 Drawing Sheets

{ FA: which set of dummy data
P1, P2: column address of dummy data
P3, P4: length of dummy data Example:

Example (a)

Example (b)

Example (c)

Example (d)

Example (e)

Example (f)

Example (g)

FLASH MEMORY SCHEME CAPABLE OF AUTOMATICALLY GENERATING OR REMOVING DUMMY DATA PORTION OF FULL PAGE DATA BY USING FLASH MEMORY DEVICE

BACKGROUND OF THE INVENTION

1. Field of the Invention

The invention relates to a storage device, and more particularly to a flash memory controller, a flash memory device, and a corresponding method.

2. Description of the Prior Art

Generally speaking, to write data portion(s) into a physical page unit of a flash memory device, a conventional flash memory controller needs to generate appropriate dummy data portion(s) to form a full page data and to transmit the full page data from the conventional flash memory controller to the flash memory device. Similarly, to read data portion(s) from a physical page unit of a flash memory device, the conventional flash memory controller needs to receive a full page data, which comprises the data portion(s) and dummy data portion(s), from the flash memory device. That is, the data content and size of the dummy data portion(s) are determined and generated by the conventional flash memory controller, and the data transmission amount between the conventional flash memory controller and a flash memory device cannot be decreased effectively and also the performance of the conventional flash memory controller is limited.

SUMMARY OF THE INVENTION

Therefore one of the objectives of the invention is to provide a storage device, and more particularly to a flash memory controller, a flash memory device, and a corresponding method, to solve the above-mentioned problems.

According to embodiments of the invention, a flash memory controller is disclosed. The flash memory controller is to be used in a storage device and coupled to a flash memory device of the storage device through a specific communication interface, and it comprises an input/output (I/O) circuit and a processor. The I/O circuit is coupled to the flash memory device through the specific communication interface, and it is used for sending commands and data between the flash memory device and the processor. The processor is coupled to the I/O circuit, and is used for controlling the I/O circuit using a set-feature signal, which carries a set-feature command, a feature address, and corresponding parameter information, and transmitting the set-feature signal to the flash memory device. The feature address corresponds to a valid data portion or a dummy data portion following the valid data portion, and both the valid data potion and the dummy data portion are comprised in a full page data which is to be written into a physical page unit of the flash memory device or is to be read out from the physical page unit. The corresponding parameter information is used to record the valid data portion's column address and data length, the dummy data portion's column address and data length, the dummy data portion's column address and the valid data portion's column address, or the dummy data portion's data length and the valid data portion's data length.

According to the embodiments, a method of a flash memory controller is disclosed. The flash memory controller is to be used in a storage device and coupled to a flash memory device of the storage device through a specific communication interface. The method comprises: providing an input/output (I/O) circuit, coupled to the flash memory device through the specific communication interface, for sending commands and data between the flash memory device and a processor;, and controlling the I/O circuit using a set-feature signal, which carries a set-feature command, a feature address, and corresponding parameter information, and transmitting the set-feature signal to the flash memory device. The feature address corresponds to a valid data portion or a dummy data portion following the valid data portion, and both the valid data potion and the dummy data portion are comprised in a full page data which is to be written into a physical page unit of the flash memory device or is to be read out from the physical page unit. The corresponding parameter information is used to record the valid data portion's column address and data length, the dummy data portion's column address and data length, the dummy data portion's column address and the valid data portion's column address, or the dummy data portion's data length and the valid data portion's data length.

According to the embodiments, a flash memory device is disclosed. The flash memory device is to be used in a storage device and coupled to a flash memory controller of the storage device through a specific communication interface, and it comprises an input/output (I/O) control circuit, a command register, an address register, a memory cell array, a physical data register, a logical data register, a multiplexer, and a control circuit. The I/O control circuit is coupled to the flash memory controller through the specific communication interface. The command register is coupled to the I/O control circuit, and is used for buffering a read command sent from the flash memory controller and transmitted through the I/O control circuit. The address register is coupled to the I/O control circuit, and is used for buffering address information sent from the flash memory controller and transmitted through the I/O control circuit. The memory cell array at least has a physical page unit. The physical data register is coupled to the memory cell array. The logical data register is coupled to the physical data register. The multiplexer is coupled to the physical data register, the logical data register, and the I/O control circuit. The control circuit is coupled to the memory cell array, the physical data register, the logical data register, and the multiplexer, and is arranged for: controlling the physical page unit transmitting a full page data from the physical page unit of the memory cell array into the physical data register in response to the read command and the buffered address information; controlling the physical data register transmitting at least one valid data portion in the full page data without transmitting other remaining data portions in the full page data from the physical data register into the logical data register; controlling the multiplexer selecting and transmitting the at least one valid data portion buffered in the logical data register to the I/O control circuit, to make the I/O control circuit output and transmit the at least one valid data portion of the full page data to the flash memory controller through the specific communication interface without sending the other remaining data portions of the full page data.

According to the embodiments, a flash memory device is disclosed. The flash memory device is to be used in a storage device and coupled to a flash memory controller of the storage device through a specific communication interface, and it comprises an input/output (I/O) control circuit, a command register, an address register, a memory cell array, a physical data register, a logical data register, a multiplexer, and a control circuit. The I/O control circuit is coupled to the flash memory controller through the specific communication interface. The command register is coupled to the I/O control circuit, and used for buffering a write command sent from the flash memory controller and transmitted through the I/O control circuit. The address register is coupled to the I/O control circuit, and used for buffering address information sent from the flash memory controller and transmitted through the I/O control circuit. The memory cell array at least has a physical page unit. The physical data register is coupled to the memory cell array. The logical data register is coupled to the physical data register. The multiplexer is coupled to the physical data register, the logical data register, and the I/O control circuit. The control circuit is coupled to the memory cell array, the physical data register, the logical data register, and the multiplexer, and is arranged for: controlling the multiplexer selecting and transmitting at least one valid data portion from the I/O control circuit into the logical data register in response to the write command; generating and inserting at least one dummy data portion, combining the at least one valid data portion with the at least one dummy data portion to form a full page data, and transmitting and buffering the full page data into the physical data register;, and controlling the physical data register transmitting the full page data from the physical data register into the physical page unit of the memory cell array based on the buffered address information, to write the full page data into the physical page unit.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution and a storage device in which a flash memory controller can access a flash memory device by sending only valid data portion(s) without sending/receiving dummy data portion(s) to read/write a full page data from/into the flash memory device wherein the full page data is formed by the valid data portion(s) and the dummy data portion(s) and resultantly stored in a physical page unit of the flash memory device. The dummy data portion(s) can be automatically generated (or removed/discarded) by the flash memory device, and this technical solution can effectively reduce the data transmission amount between the flash memory controller and the flash memory device.

Figure 1:
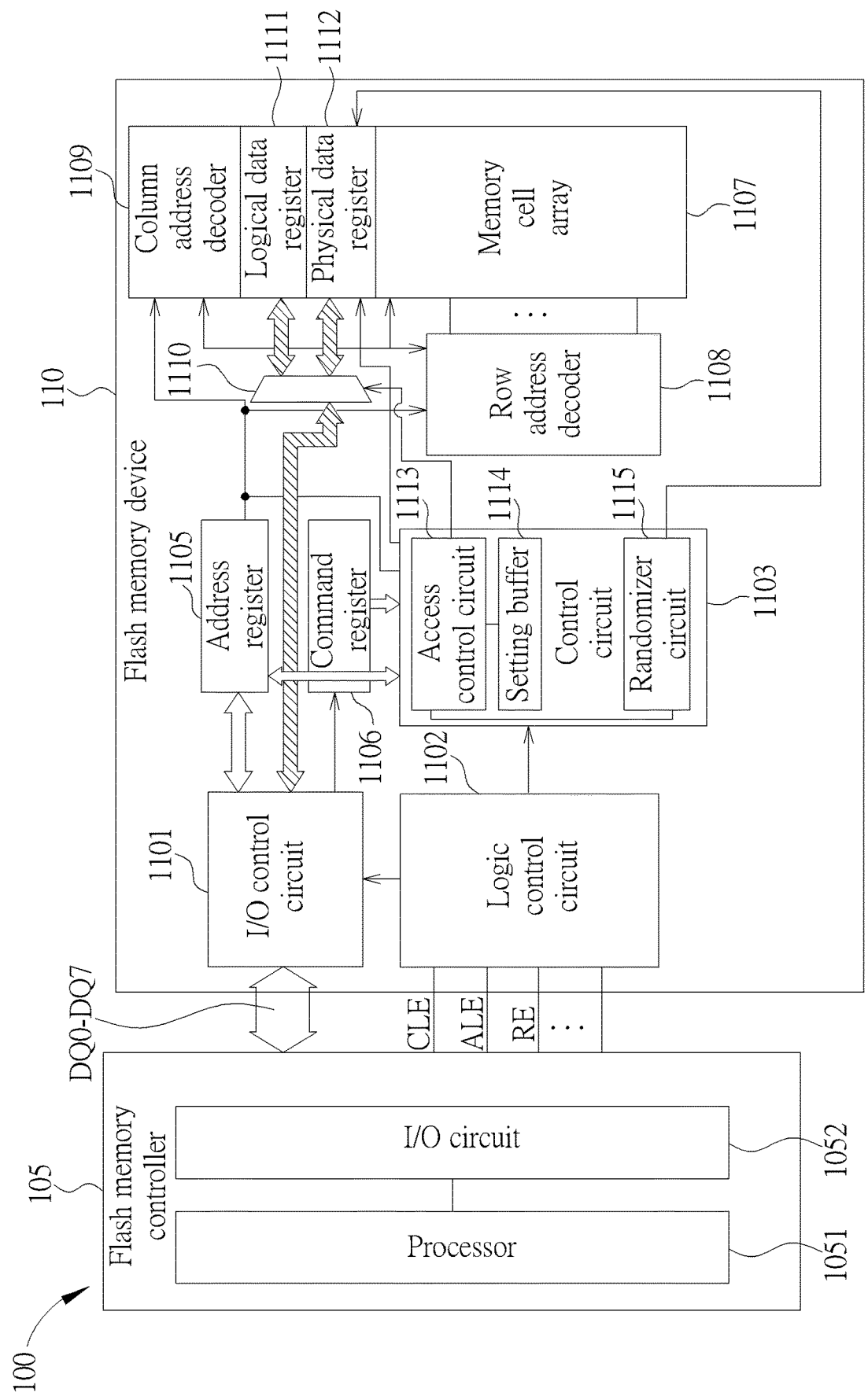
FIG. 1 is a block diagram of a storage device according to embodiments of the invention.

FIG. 1 is a block diagram of a storage device 100 according to embodiments of the invention. The storage device 100 for example is a flash memory storage device (but not limited) and comprises a memory controller such as a flash memory controller 105 and a memory device such as a flash memory device 110 having multiple flash memory chips/dies, each flash memory chip/die may comprise one or more different flash memory planes. The flash memory controller 105 at least comprises a processor 1051 and an input/output (I/O) circuit 1052. The processor 1051 is coupled to the I/O circuit 1052 and is arranged to control the I/O circuit 1052 sending access (e.g. read, write, erase, or the others) commands through a specific communication interface to the flash memory device 110 to control and access the flash memory device 110.

The flash memory device 110 comprises an I/O control circuit 1101, a logic control circuit 1102, a control circuit 1103, an address register 1105, a command register 1106, a memory cell array 1107, a row address decoder 1108, a column address decoder 1109, a selection circuit such as a multiplexer 1110, a logical data register 1111, and a physical data register 1112, wherein the control circuit 1103 comprises an access control circuit 1113, a setting buffer 1114, and a randomizer circuit 1115. The memory cell array 1107 for example comprises a plurality of storage units such as blocks, pages, or sectors.

The flash memory controller 105 is coupled to the flash memory device 110 through the specific communication interface and controls or accesses the flash memory device 110 by sending one or more commands into the flash memory device 110. The specific communication interface for example comprises at least signal ports/pins such as data pins DQ0-DQ7 or other data pins (not shown in FIG. 1), and logic control pins such as CLE (Command Latch Enable), ALE (Address Latch Enable), RE (Read Enable), and other logical control pins. The data pins are coupled to the I/O control circuit 1101, and the logic control pins are coupled to the logic control circuit 1102.

A physical page storage unit in the memory cell array 1107 of the flash memory device 110 is arranged to store a full page data which includes at least one valid data portion and at least one dummy data portion wherein the at least one dummy data portion is used to be combined with the at least one valid data portion to meet the data size requirement of one full page data. The storage device 100 has two processing modes/behaviors, and in a first mode/behavior the dummy data portion is determined and generated by the flash memory controller 105 while in a second mode/behavior the dummy data portion can be determined and generated by the flash memory device 110 so as to reduce the data transmission amount of the specific communication interface as well as improve the data transmission speed. For example, in the first mode such as a default processing (write or read) mode/behavior, the flash memory controller 105 transmits a page data unit including both valid data portion(s) and dummy data portion(s) to the flash memory device 110 through the specific communication interface when determining to write such page data unit into the flash memory device 110, and a page data unit including both valid data portion(s) and dummy data portion(s) is transmitted from the flash memory device 110 to the flash memory controller 105 through the specific communication interface when a data read operation is performed.

Alternatively, in the second mode/behavior, the flash memory controller 105 transmits the valid data portion(s) of a page data unit without transmitting the dummy data portion(s) to the flash memory device 110 when a data write operation is performed, and the flash memory device 110 can automatically generate the dummy data portion (s) and combine the valid data portion (s) with the dummy data portion (s) to generate such page data unit to write the combined data unit into a physical page unit. When a data read operation is performed, the flash memory device 110 can automatically remove the dummy data portion (s) of a page data unit stored in a physical page unit to obtain the valid data portion(s) of such page data unit and transmits the valid data portion(s) to the flash memory controller 105.

Figure 2:
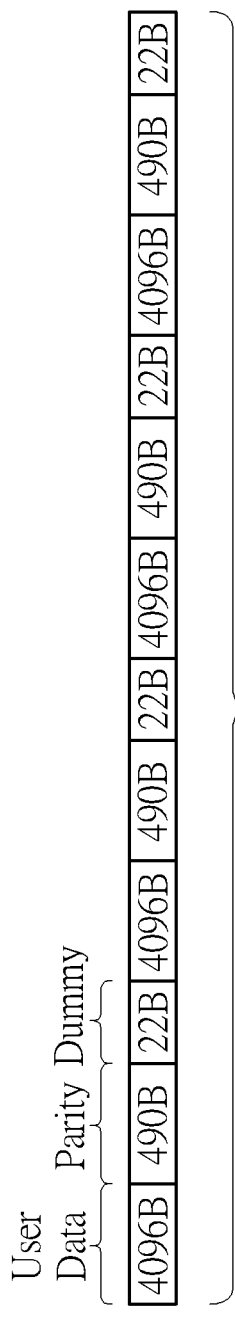
FIG. 2 is a diagram showing an example of a full page data unit stored in a physical page unit of the memory cell array according to an embodiment of the invention.

FIG. 2 is a diagram showing an example of a full page data unit stored in a physical page unit of the memory cell array 1107 according to an embodiment of the invention. In FIG. 2, the size of the full page data unit for example (but not limited) is 18432 B wherein the capital letter 'B' indicates one byte. The flash memory controller 105 for example supports a 4 KB LPDC (four-kilobyte low-density parity-check code) programming mode, and thus a valid data portion to be written by the flash memory controller 105 comprises a user data portion having 4096 B and a parity data portion having 490 B; the valid data portion can be referred to as an error correction code (ECC) chunk. In FIG. 2, a physical page unit can store four ECC chunks, and four dummy data portions (its size is 22 B) are respectively inserted after the tails of the ECC chunks to form a full or complete page data so as to avoid the data being attacked by a hacker.

Figure 3:
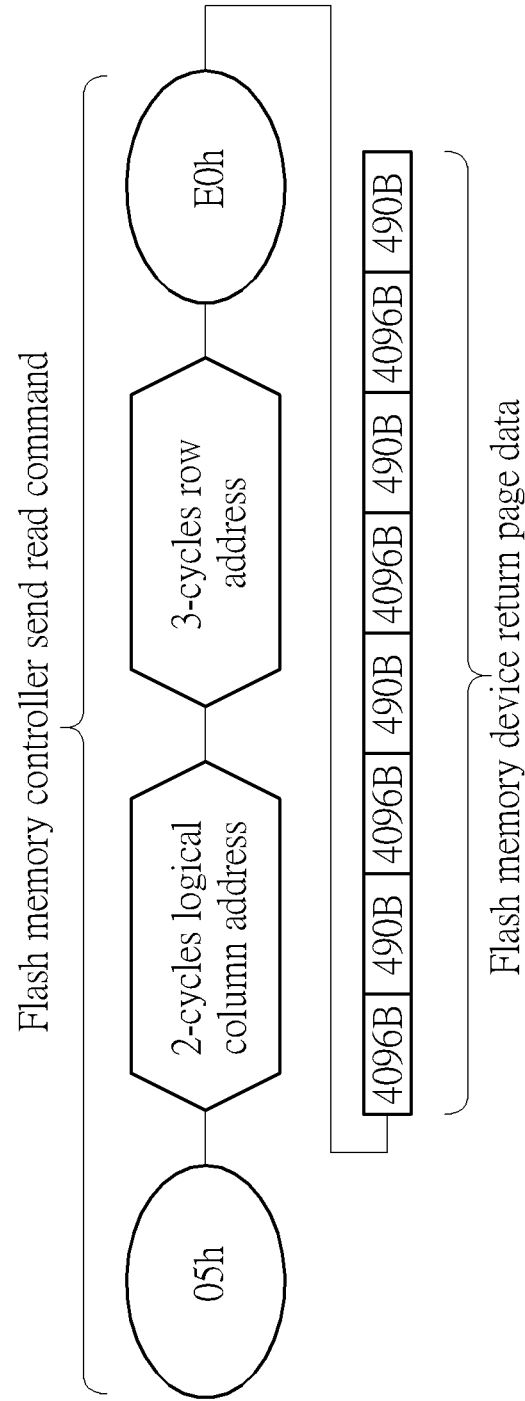
FIG. 3 is a diagram showing an example of a data read operation according to an embodiment of the invention.
Figure 4:
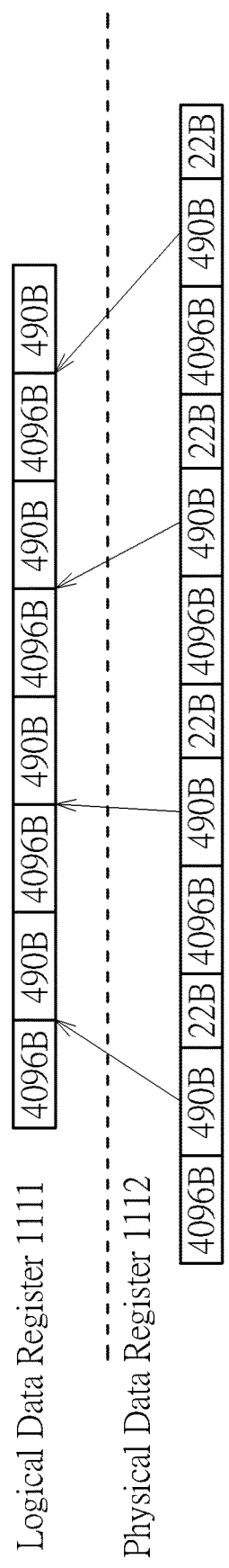
FIG. 4 is a diagram of an example of the operations of flash memory device according to the embodiment in FIG. 3.

Refer to FIG. 3 in conjunction with FIG. 4. FIG. 3 is a diagram showing an example of a data read operation according to an embodiment of the invention. FIG. 4 is a diagram of an example of the operations of flash memory device 110 according to the embodiment in FIG. 3. In FIG. 3, the flash memory controller 105 sequentially sends a read command 05h, address information including a logical column address (e.g. 2-cycles address data) and a logical row address (e.g. 3-cycles address data), and a read execution command E0h to the flash memory device 110. Based on the read command 05h and the read execution command E0h, after receiving the read execution command E0h, the processor 1051 of the flash memory controller 105 can control the memory cell array 1107 outputting data such as a page data from a physical page unit of the memory cell array 1107 into to the physical data register 1112, wherein the page data stored by the physical page unit (i.e. a physical page storage unit) of the memory cell array 1107 comprises four valid data portions (four user data portions and four parity data portions) and four dummy data portions as shown in FIG. 2. Then, data of the full page data, which comprises the four valid data portions and four dummy data portions, are sequentially outputted from the physical page unit of the memory cell array 1107 into and stored by the physical data register 1112. As shown in FIG. 4, the four valid data portions (i.e. four sets of user data 4096 B combined with parity data 490 B) are sequentially and respectively transmitted and moved from the physical data register 1112 to the logical data register 1111 and sequentially stored in the logical data register 1111, and the four dummy data portions (i.e. four sets of dumpy data 22 B) are not transmitted to the logical data register 1111 and can be discarded by the flash memory device 110. Then, the flash memory device 110 (or control circuit 1103) controls the logical data register 1111 sequentially outputting the four valid data portions to the I/O control circuit 1101 through the multiplexer 1110, so that the I/O control circuit 1101 can sequentially transmit the four valid data portions in the full page data to the flash memory controller 105 through the pins DQ0-DQ7 of the specific communication interface. As shown in FIG. 3, after the read execution command E0h, once a read operation corresponding to the read execution is completed, the four valid data portions are sequentially transmitted from the flash memory device 110 to the flash memory controller 105.

Figure 5:
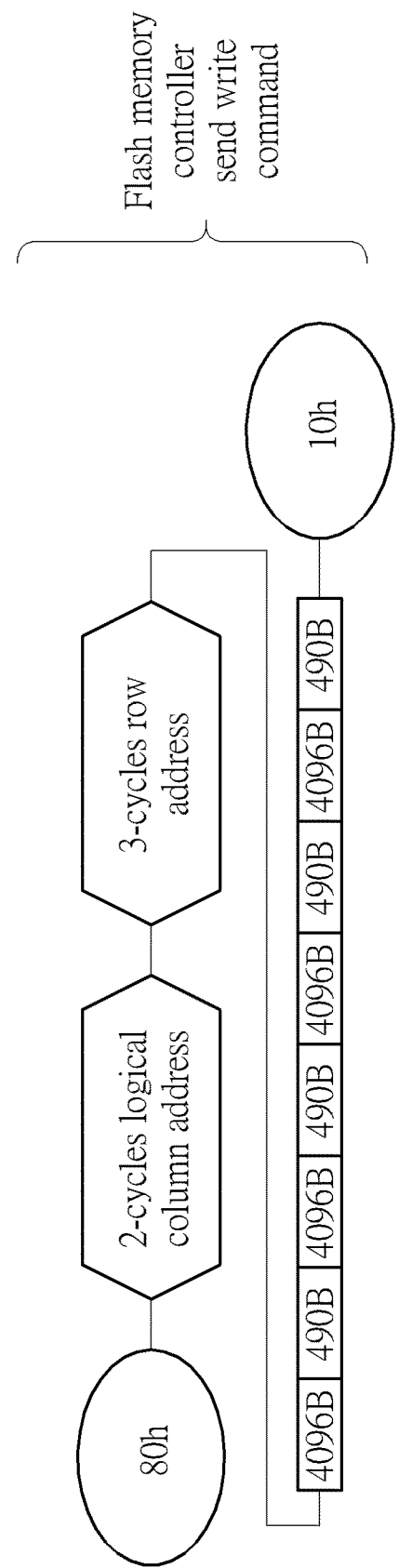
FIG. 5 is a diagram showing an example of a data write operation according to an embodiment of the invention.
Figure 6:
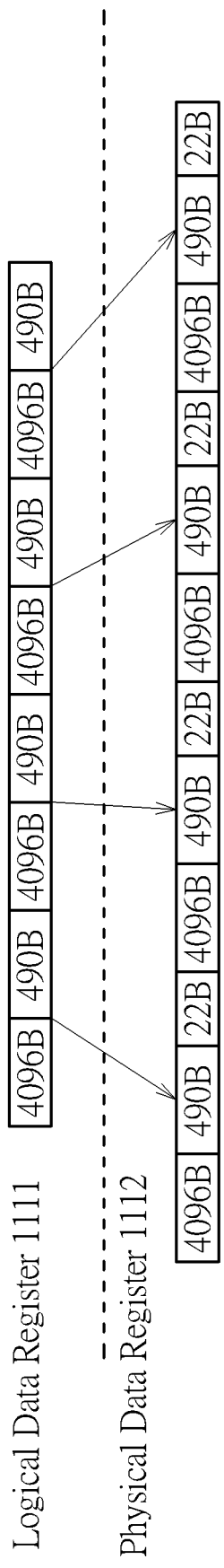
FIG. 6 is a diagram of an example of the operations of flash memory device according to the embodiment in FIG. 5.

Refer to FIG. 5 in conjunction with FIG. 6. FIG. 5 is a diagram showing an example of a data write operation according to an embodiment of the invention. FIG. 6 is a diagram of an example of the operations of flash memory device 110 according to the embodiment in FIG. 5. For a data write operation, to write a data unit such as a page data into a page storage unit of the memory cell array 1107, the flash memory controller 105 sequentially sends a write command 80h, address information including a logical column address (e.g. 2-cycles address data) and a logical row address (e.g. 3-cycles address data), multiple sets of valid data portions (e.g. a valid data portion is user data portion 4096 B combined with parity data portion 490 B) in the page data, and a write execution command 10h to the flash memory device 110 through the specific communication interface, and it uses the different level switching of pins ALE, CLE, and RE to control the control circuit 1103 controlling the I/O control circuit 1101 respectively transmitting the write command 80h into the command register 1106 and the address information into the address register 1105. In addition, the four sets of valid data portions are sequentially transmitted through the data pins DQ0-DQ7 to the I/O control circuit 1101, and are sequentially transmitted from the I/O control circuit 1101 to the multiplexer 1110. The control circuit 1103 (or access control circuit 1113) can control the multiplexer 1110 selecting the logical data register 1111, so that the logical data register 1111 sequentially stores the four sets of valid data portions. The column address decoder 1109 and row address decoder 1108 are arranged to find an appropriate page storage unit based on the address information stored in the address register 1105. In FIG. 6, the logical data register 1111 moves the written valid data portions sequentially into the physical data register 1112 as well as the randomizer circuit 1115 determines and transmits the data content of four dummy data portions into the physical data register 1112, so that data content of a full or complete page data is formed by combining the four valid data portions with the four dummy data portions respectively. Then, the full or complete page data is transmitted and written into the found physical page unit of the memory cell array 1107. In this situation, the page data to be written and sent from the flash memory controller 105 comprises the valid data portions and excludes dummy data portions, and the dummy data portions are automatically determined and generated by the flash memory device 110. That is, in this situation, the dummy data portions are not transmitted from the flash memory controller 105 to the flash memory device 110.

Further, it should be noted that, the flash memory controller 105 may support a different processing operation such as a different write operation such as 8 KB read/write operation different from 4 KB read/write operation, and the flash memory controller 105 (or processor 1051) controls its I/O circuit 1052 sending one or more specific set-feature signals (or command sequences) into the flash memory device 110 through the specific communication interface to configure one or more parameter information/setting associated with dummy data. The number of specific set-feature signals is variable, and for example the number is equal to four for the 4 KB read/write operation while the number may be equal to eight for the 8 Kb read/write operation.

Figure 7:
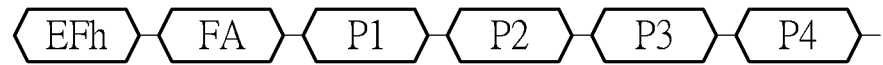
FIG. 7 is a diagram showing a set-feature command sequence format and a corresponding example sent from the flash memory controller to the flash memory device based on the 4 KB read/write operation according to an embodiment of the invention.
Figure 7:
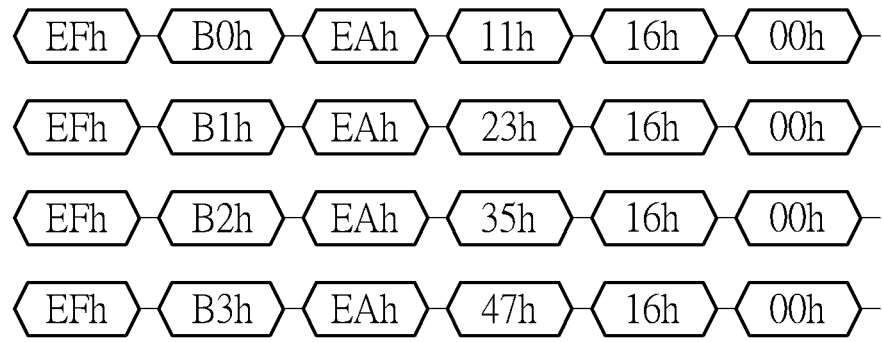

FIG. 7 is a diagram showing a set-feature command sequence format and a corresponding example sent from the flash memory controller 105 to the flash memory device 110 based on the 4 KB read/write operation according to an embodiment of the invention. In FIG. 7, the format of a specific set-feature signal which comprises a set-feature command such as EFh (i.e. 0xEF; 'h' means hexadecimal), a feature address indicated by FA, and feature information data or parameters P1-P4 each being formed by one byte (i.e. eight bits, but not limited). The content of feature address FA is used to determine and indicate which dummy data portion following a specific valid data portion including a user data portion and a parity data portion. In FIG. 7, the parameter data P1 and parameter data P2 of the set-feature signal can be used to indicate a byte column address or a byte starting position/index of a dummy data portion following the valid data portion indicated by the feature address FA, and the parameter data P3 and parameter data P4 of the set-feature signal can be used to indicate a byte data length of the dummy data portion following the valid data portion indicated by the feature address FA.

For example, in the example shown in FIG. 7, the flash memory controller 105 is arranged to perform the 4 KB LDPC read/write operation to read/write four sets of user data portions and parity data portions wherein the data size of one user data portion is 4096 B (i.e. 4 KB) and the data size of one parity data portion is 490 B that is determined based on the LDPC code, and it sequentially sends four set-feature signals (or command sequences) to the flash memory device 110 to notify the flash memory device 110 of corresponding information. For example (but not limited), the flash memory controller 105 can notify the flash memory device 110 of corresponding byte address information (byte starting position/index) and byte length of one or each dummy data portion to be written into the full page data stored by a physical page storage unit. In FIG. 7, a first set-feature signal sequentially comprises the set-feature command EFh, the feature address B0h, and the parameter data P1-P4, wherein the first feature address B0h indicates a first dummy data portion to be inserted, the parameter data P1-P2 carry information of EAh and 11h to indicate a byte column address (or starting index value) 11EAh (i.e. 4586, the sum of values 4096 and 490) of the first dummy data portion, the parameter data P3-P4 carry information of 16h and 00h to indicate the byte length 0016h (i.e. 22) of the first dummy data portion. A second set-feature signal sequentially comprises the set-feature command EFh, the feature address B1h, and the parameter data P1-P4, wherein the second feature address B1h indicates a second dummy data portion to be inserted, the parameter data P1-P2 carry information of EAh and 23h to indicate a byte column address (or starting index value) 23EAh (i.e. 9194) of the second dummy data portion, the parameter data P3-P4 carry information of 16h and 00h to indicate the byte length 0016h (i.e. 22) of the second dummy data portion. A third set-feature signal sequentially comprises the set-feature command EFh, the feature address B2h, and the parameter data P1-P4, wherein the third feature address B2h indicates a third dummy data portion to be inserted, the parameter data P1-P2 carry information of EAh and 35h to indicate a byte column address (or starting index value) 35EAh (i.e. 13802) of the third dummy data portion, the parameter data P3-P4 carry information of 16h and 00h to indicate the byte length 0016h (i.e. 22) of the third dummy data portion. A fourth set-feature signal sequentially comprises the set-feature command EFh, the feature address B3h, and the parameter data P1-P4, wherein the fourth feature address B3h indicates a fourth dummy data portion to be inserted, the parameter data P1-P2 carry information of EAh and 47h to indicate a byte column address (or starting index value) 47EAh (i.e. 18410) of the fourth dummy data portion, the parameter data P3-P4 carry information of 16h and 00h to indicate the byte length 0016h (i.e. 22) of the fourth dummy data portion.

Thus, after receiving the four set-feature signals mentioned above, the flash memory device 110 (or control circuit 1103) can know the byte column addresses and the byte lengths of four dummy data portions, and the received information of byte column addresses and byte lengths and corresponding feature addresses can be stored in the setting buffer 1114. When the flash memory controller 105 enables the operation of flash memory device automatically generating/removing the dummy data portion(s), the access control circuit 1113 can refer to the information stored in the setting buffer 1114 to correspondingly control the multiplexer 1110, logical data register 111, and physical data register 1112 to perform a corresponding selection operation. For example, for a read operation, when the full page data is moved into the physical data register 1112 from the memory cell array 1107, the access control circuit 1113 can refer to the byte address and length information stored in the setting buffer 1114 to control the physical data register 1112 discarding the dummy data portions of the full page data in the physical data register 1112 and transmitting only the remaining valid data portions into the logical data register 1111. Then, access control circuit 1113 can control the multiplexer 1110 selecting and transmitting the valid data portions from the logical data register 1111 to the I/O control circuit 1101. For a write operation, when only valid data portions are transmitted from the flash memory controller 105 to the I/O control circuit 1101, the access control circuit 1113 can control the multiplexer 1110 selecting and transmitting the valid data portions from the I/O control circuit 1101 to the logical data register 1111, and the randomizer circuit 1115 automatically determines and generate the data content of dummy data portions. Then, the access control circuit 1113 can refer to the byte address and length information stored in the setting buffer 1114 to respectively insert the dummy data portion into appropriate data positions to form a full page data and store the full page data into the physical data register 1112, so that the full page data in the physical data register 1112 can be directly moved or transmitted into the storage space of a physical page unit of the memory cell array 1107.

Figure 8:
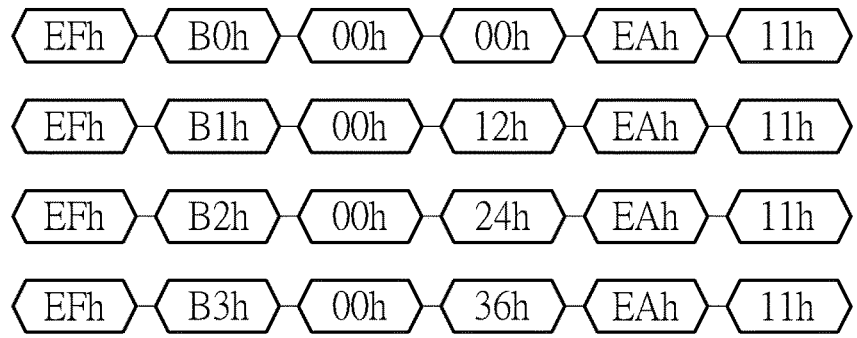
FIG. 8 is a diagram showing a set-feature command sequence format and a corresponding example sent from the flash memory controller to the flash memory device based on the 4 KB read/write operation according to another embodiment of the invention.

In other embodiments, the format of a set-feature signal can be used to carry byte column address information and byte length information of one or each valid data portion having the user data portion and parity data portion. After receiving such set-feature signal, the flash memory device 110 can automatically calculate and obtain byte column address information and byte length information of a specific dummy data portion following a specific valid data portion mentioned in the set-feature signal. FIG. 8 is a diagram showing a set-feature command sequence format and a corresponding example sent from the flash memory controller 105 to the flash memory device 110 based on the 4 KB read/write operation according to another embodiment of the invention. In FIG. 8, the format of a specific set-feature signal which comprises a set-feature command such as EFh, a feature address indicated by FA, and feature information data or parameters P1-P4 each being formed by one byte (i.e. eight bits, but not limited). The content of feature address FA is used to determine and indicate which valid data portion including a user data portion and a parity data portion. In FIG. 8, the parameter data P1 and parameter data P2 of the set-feature signal can be used to indicate a byte column address or a byte starting position/index of the set of the valid data portion indicated by the feature address FA, and the parameter data P3 and parameter data P4 of the set-feature signal can be used to indicate a byte data length of the set of the valid data portion indicated by the feature address FA.

For example, in the example shown in FIG. 8, the flash memory controller 105 is arranged to perform the 4 KB LDPC read/write operation to read/write four valid data portions each comprising a user data portion and a parity data portion wherein the data size of one user data portion is 4096 B (i.e. 4 KB) and the data size of one parity data portion is 490 B that is determined based on the LDPC code, and it sequentially sends four set-feature signals (or command sequences) to the flash memory device 110 to notify the flash memory device 110 of corresponding information. For example (but not limited), the flash memory controller 105 can notify the flash memory device 110 of corresponding byte address information (byte starting position/index) and byte length of one or each valid data portion to be written into the full page data stored by a physical page storage unit. In FIG. 8, a first set-feature signal sequentially comprises the set-feature command EFh, the feature address B0h, and the parameter data P1-P4, wherein the first feature address B0h indicates a first valid data portion, the parameter data P1-P2 carry information of 00h and 00h to indicate a byte column address (or starting index value) 0000h (i.e. 0) of the first valid data portion, the parameter data P3-P4 carry information of EAh and 11h to indicate the byte length 11EAh (i.e. 4586, the sum of values 4096 and 490) of the first valid data portion. A second set-feature signal sequentially comprises the set-feature command EFh, the feature address B1h, and the parameter data P1-P4, wherein the second feature address B1h indicates a second valid data portion, the parameter data P1-P2 carry information of 00h and 12h to indicate a byte column address (or starting index value) 1200h (i.e. 4608) of the second valid data portion, the parameter data P3-P4 carry information of EAh and 11h to indicate the byte length 11EAh (i.e. 4586) of the second valid data portion. A third set-feature signal sequentially comprises the set-feature command EFh, the feature address B2h, and the parameter data P1-P4, wherein the third feature address B2h indicates a third valid data portion, the parameter data P1-P2 carry information of 00h and 24h to indicate a byte column address (or starting index value) 2400h (i.e. 9216) of the third valid data portion, the parameter data P3-P4 carry information of EAh and 11h to indicate the byte length 11EAh (i.e. 4586) of the third valid data portion. A fourth set-feature signal sequentially comprises the set-feature command EFh, the feature address B3h, and the parameter data P1-P4, wherein the fourth feature address B3h indicates a fourth valid data portion, the parameter data P1-P2 carry information of 00h and 36h to indicate a byte column address (or starting index value) 3600h (i.e. 13824) of the fourth valid data portion, the parameter data P3-P4 carry information of EAh and 11h to indicate the byte length 11EAh (i.e. 4586) of the fourth valid data portion. That is, to make the flash memory device 110 store corresponding address and length information of dummy data portion(s), the flash memory controller 105 can send the corresponding address and length information of dummy data portion(s) or send corresponding address and length information of valid data portion(s) to the flash memory device 110.

It should be noted that the number of set-feature signals, used to send byte address and byte length information, can be different from two or four and may be greater than 16. Thus, the content of feature address FA for example may be other hexadecimal values such as CXh wherein the value indicated by 'X' may range from zero to 15.

Further, in other embodiments, the parameter data P1-P2 and P3-P4 of a specific set-feature signal transmitted from the flash memory controller 105 may be respectively used to transmit the byte column address information of a valid data portion and the byte column address information of a dummy data portion to be generated/removed by the flash memory device 110, and the control circuit 1103 (or access control circuit 1113) can correspondingly determine and generate the byte length information of the valid data portion and the byte length information of such dummy data portion to be generated/removed based on both the received byte column address information. Further, in other embodiments, the parameter data P1-P2 and P3-P4 of a specific set-feature signal transmitted from the flash memory controller 105 may be respectively used to transmit the byte length information of a valid data portion and the byte length information of a dummy data portion to be generated/removed by the flash memory device 110, and the control circuit 1103 (or access control circuit 1113) can correspondingly determine and generate the byte column address information of the valid data portion and the byte column address information of such dummy data portion to be generated/removed based on both the received byte length information.

Figure 9:
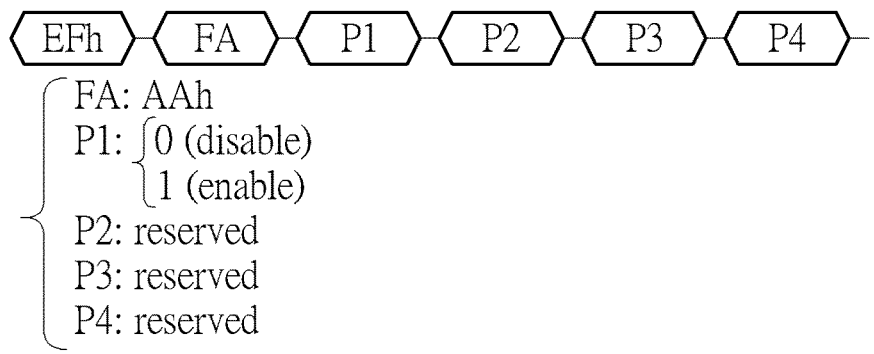
FIG. 9 is a diagram showing a set-feature command sequence format which is used to enable or disable the flash memory device's operation according to an embodiment of the invention.

Further, after or before sending the set-feature signal (s) carrying byte address and byte length information to the flash memory device 110, the flash memory controller 105 (or processor 1051) can control the I/O circuit 1052 sending a specific set-feature signal to enable or disable the flash memory device's 110 operation which is used for automatically generating or discarding/removing the dummy data portion (s). FIG. 9 is a diagram showing a set-feature command sequence format which is used to enable or disable the flash memory device's 110 operation according to an embodiment of the invention. In FIG. 9, the format of a specific set-feature signal which comprises a set-feature command such as EFh, a feature address indicated by FA such as AAh which is different from the feature address used in FIG. 7 and FIG. 8, and feature information data or parameters P1-P4 each being formed by one byte (i.e. eight bits, but not limited). The content AAh of feature address FA is used to indicate that this set-feature signal is used to enable or disable the flash memory device's 110 operation that is used for automatically generating or discarding/removing the dummy data portion(s). The parameter data P1 is for example implemented by using one bit, and the operation of automatically generating or discarding/removing the dummy data portion (s) is disabled when the bit is set as a first logic bit '0' while the operation is enabled when the bit is set as a second logic bit '1'. The other parameter data P2-P4 may be reserved.

For instance, when receiving an example of the set-feature signal in FIG. 9 (e.g. parameter data P1 has the bit '1') and the examples of set-feature signals in FIG. 7, the flash memory device 110 (or control circuit 1103) may know that the operation of automatically generating or discarding/removing the dummy data portion(s) is enabled, and the corresponding byte address and length information can be stored in the setting buffer 1114, so that the flash memory device 110 can send a sequence of valid data portions (excluding dumpy data) associated with a full page data to the flash memory controller 105 for the data read operation in FIG. 3. Similarly, for the data write operation, the flash memory device 110 can also receive a sequence of valid data portions (excluding dumpy data) associated with a full page data from the flash memory controller 105, as shown in FIG. 5.

Figure 10:
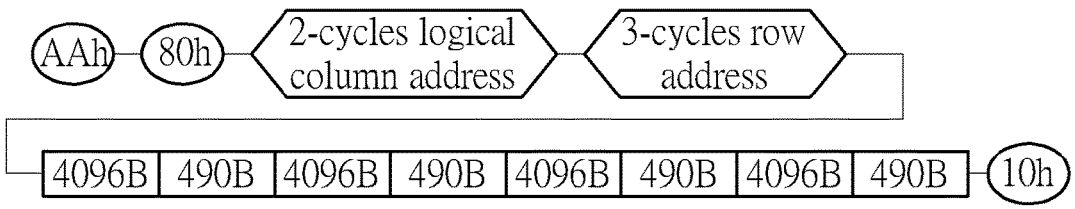
FIG. 10 is a diagram showing different scenario examples of a data write operation according to another embodiment of the invention.
Figure 10:
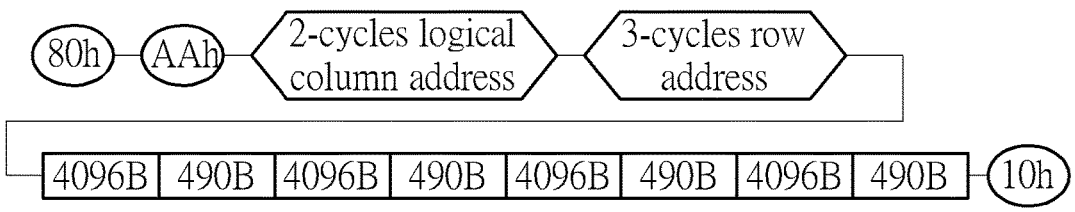
Figure 10:
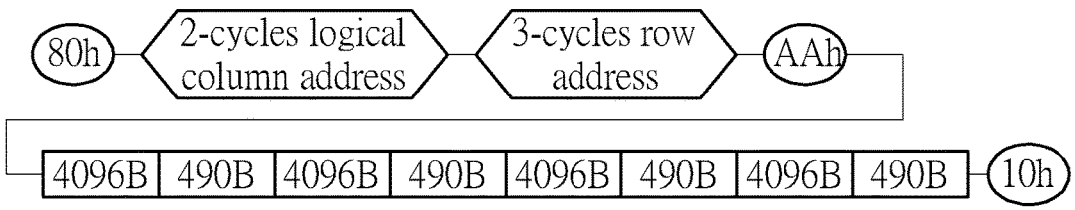
Figure 10:
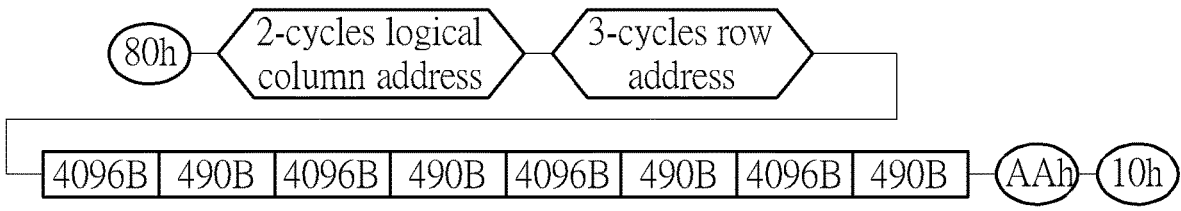

Alternatively, in other embodiments, the flash memory controller 105 can send valid data portions of a write operation and simultaneously enable the operation of automatically generating dummy data portion(s) by using only one command sequence. FIG. 10 is a diagram showing different scenario examples of a data write operation according to another embodiment of the invention. In the different scenario examples, a command sequence of a write operation may comprise a write command 80h, address information including a logical column address (e.g. 2-cycles address data) and a logical row address (e.g. 3-cycles address data), multiple sets of valid data portions (e.g. a valid data portion is user data portion 4096 B combined with parity data portion 490 B) in the page data, and a write execution command 10h, and a specific command such as AAh (but not limited) which is used to enable the operation of automatically generating dummy data portion(s) can be inserted into different positions in the command sequence of the write operation. For example, in a first scenario example (a) of FIG. 10, the specific command AAh is inserted and transmitted before the write command 80h. In a second scenario example (b), the specific command AAh is inserted and transmitted between the write command 80h and the logical column address. In a third scenario example (c), the specific command AAh is inserted and transmitted between the logical row address and the first valid data portion. In a fourth scenario example (d), the specific command AAh is inserted and transmitted between the last valid data portion and the write execution command 10h. In other embodiments, the specific command AAh may be inserted and transmitted between the logical column address and the logical row address, or it may be transmitted between any two valid data portions; the modifications also fall within the scope of the invention.

Figure 11:
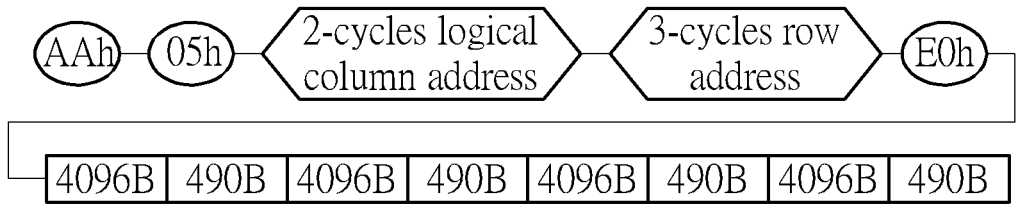
FIG. 11 is a diagram showing different scenario examples of a data read operation according to another embodiment of the invention.
Figure 11:
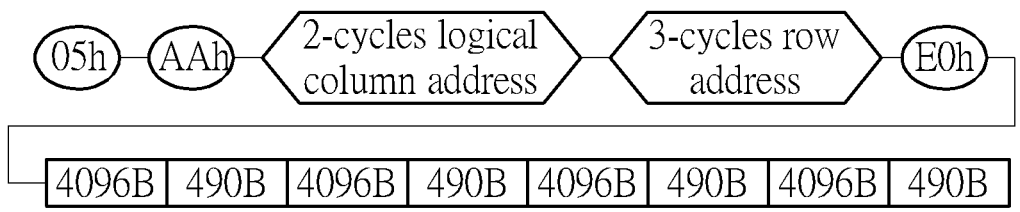
Figure 11:
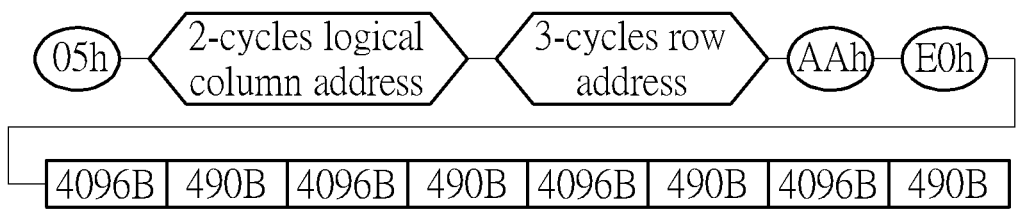

Further, in other embodiments, the flash memory controller 105 can send a read command sequence of a read operation and simultaneously enable the operation of automatically generating dummy data portion(s) by using only one command sequence. FIG. 11 is a diagram showing different scenario examples of a data read operation according to another embodiment of the invention. In the different scenario examples, a command sequence of a read operation may comprise a read command 05h, address information including a logical column address (e.g. 2-cycles address data) and a logical row address (e.g. 3-cycles address data), and a read execution command E0h, and after receiving such read command sequence the flash memory device 110 can transmit corresponding valid data portions such as four valid data portions each comprising a user data portion having the data size 4096 B and a parity data portion having the data size 490 B. A specific command such as AAh (but not limited) which is used to enable the operation of automatically removing/discarding dummy data portion(s) can be inserted into different positions in the read command sequence of the read operation. For example, in a first scenario example (e) of FIG. 11, the specific command AAh is inserted and transmitted before the read command 05h. In a second scenario example (f), the specific command AAh is inserted and transmitted between the read command 05h and the logical column address. In a third scenario example (g), the specific command AAh is inserted and transmitted between the logical row address and the read execution command E0h. In other embodiments, the specific command AAh may be inserted and transmitted between the logical column address and the logical row address; the modifications also fall within the scope of the invention.

Figure 12:
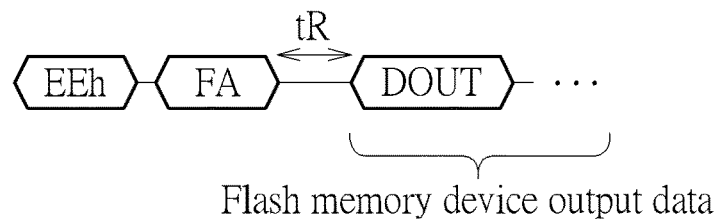
FIG. 12 is a diagram of an example of a get-feature signal according to an embodiment of the invention.
Figure 12:
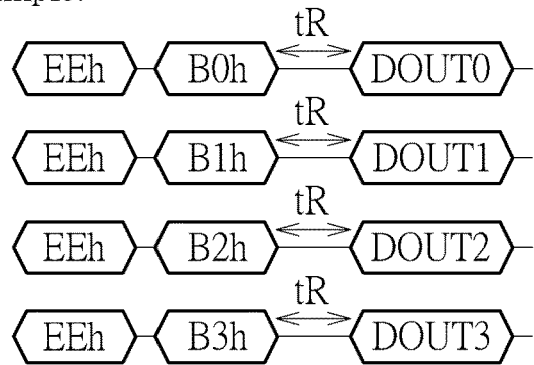

Further, in one embodiment, the flash memory controller 105 (or processor 1051) may control the I/O circuit 1052 sending a get-feature signal to the flash memory device 110 to make the flash memory device 110 transmit the previously configured set-feature information back to the flash memory controller 105. FIG. 12 is a diagram of an example of a get-feature signal according to an embodiment of the invention. The get-feature signal comprises a get-feature command such as EEh (but not limited) and a feature address indicated by FA. After a read page operation time tR has been finished, the flash memory device 110 can output and transmit the information data, i.e. at least one information data DOUT, to the flash memory controller 105. For example, the flash memory controller 105 may send a first get-feature signal, which comprises the get-feature command EEh and the feature address B0h that indicates the first dummy data portion in FIG. 7 (or the first valid data portion in FIG. 8), and the flash memory device 110 after receiving the first get-feature signal can output and transmit the information data DOUT0 which comprises the information of parameter data P1-P4 corresponding to the first dummy data portion in FIG. 7 (or the first valid data portion in FIG. 8). Similarly, the flash memory controller 105 may send a second get-feature signal, which comprises the get-feature command EEh and the feature address B1h that indicates the second dummy data portion in FIG. 7 (or the second valid data portion in FIG. 8), and the flash memory device 110 after receiving the second get-feature signal can output and transmit the information data DOUT1 which comprises the information of parameter data P1-P4 corresponding to the second dummy data portion in FIG. 7 (or the second valid data portion in FIG. 8). Similarly, the flash memory controller 105 may send a third get-feature signal, which comprises the get-feature command EEh and the feature address B2h that indicates the third dummy data portion in FIG. 7 (or the third valid data portion in FIG. 8), and the flash memory device 110 after receiving the third get-feature signal can output and transmit the information data DOUT2 which comprises the information of parameter data P1-P4 corresponding to the third dummy data portion in FIG. 7 (or the third valid data portion in FIG. 8). Similarly, the flash memory controller 105 may send a fourth get-feature signal, which comprises the get-feature command EEh and the feature address B3h that indicates the fourth dummy data portion in FIG. 7 (or the fourth valid data portion in FIG. 8), and the flash memory device 110 after receiving the fourth get-feature signal can output and transmit the information data DOUT3 which comprises the information of parameter data P1-P4 corresponding to the fourth dummy data portion in FIG. 7 (or the fourth valid data portion in FIG. 8). After receiving the reported information data of parameter data P1-P4, the flash memory controller 105 can check whether the reported information data matches the information data previously configured.

Figure 13:
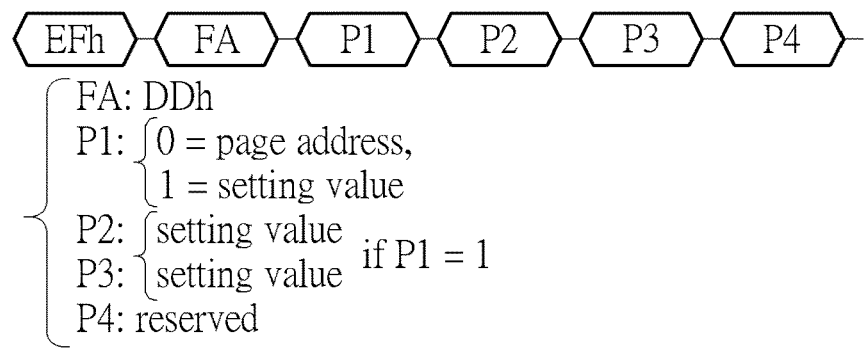
FIG. 13 is a diagram of an example of a set-feature signal used for determining the operation of randomizer circuit according to an embodiment of the invention.

Further, in other embodiments, the flash memory controller 105 (or processor 1051) may control the I/O circuit 1052 sending a set-feature signal to the flash memory device 110 to make the flash memory device 110 (or randomizer circuit 1115) generate a different data content as a dummy data portion in response to a different setting. FIG. 13 is a diagram of an example of a set-feature signal used for determining the operation of randomizer circuit 1115 according to an embodiment of the invention. In FIG. 13, a format of the set-feature signal sequentially comprises the set-feature command EFh, the feature address FA, and feature information data or parameters P1-P4 each being formed by one byte (i.e. eight bits, but not limited). In an example, when the feature address FA indicates DDh (but not limited), this indicates that the set-feature signal is used to configure the operation of the randomizer circuit 1115 for determining the generation of a dummy data portion. The parameter data P1 of the set-feature signal can be for example implemented by using one bit, and the operation of generating a dummy data portion is performed based on the address information (which may be called as a page address or a byte column address) of the dummy data portion when the bit is set as a first logic bit '0' while the operation is performed based on a setting value or a fixed value when the bit is set as a second logic bit '1'. The parameter data P2 and parameter data P3 of the set-feature signal can be used to indicate the information of the setting value or fixed value when the parameter data P1 indicates the second logic bit '1'; the parameter data P2 and parameter data P3 may be 00h if the parameter data P1 indicates the first logic bit '0'. The parameter data P4 may be reserved. Thus, based on the set-feature signal in FIG. 13, the randomizer circuit 1115 may generate the different data contents as the dummy data portions respectively for the different valid data portions in response to the different address information, so as to avoid that an undesired data pattern frequently occurs in the data content of the generated dummy data portions. In practice, the different address information (or setting/fixed value if the parameter data P1 indicates the logic bit '1') may be used as a different seed value (i.e. a different random seed) to be inputted to the randomizer circuit 1115 which refers to the received random seed to generate and determine a different pseudo random data pattern as the content of a dummy data portion.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller to be used in a storage device and coupled to a flash memory device of the storage device through a specific communication interface, comprising:

an input/output (I/O) circuit, coupled to the flash memory device through the specific communication interface, for sending commands and data between the flash memory device and a processor; and the processor, coupled to the I/O circuit, for controlling the I/O circuit using a set-feature signal, which carries a set-feature command, a feature address, and corresponding parameter information, and transmitting the set-feature signal to the flash memory device;

wherein the feature address corresponds to a valid data portion or a dummy data portion following the valid data portion, and both the valid data potion and the dummy data portion are comprised in a full page data which is to be written into a physical page unit of the flash memory device or is to be read out from the physical page unit; the corresponding parameter information is used to record the valid data portion's column address and data length, the dummy data portion's column address and data length, the dummy data portion's column address and the valid data portion's column address, or the dummy data portion's data length and the valid data portion's data length.

2. The flash memory controller of claim 1, wherein the processor controls the I/O circuit transmitting another set-feature signal, which carries the set-feature command, a different feature address, and different parameter information, to the flash memory device; the different feature address and the different parameter information are used to indicate whether to enable or disable an operation of the flash memory device automatically generating or automatically discarding the dummy data portion.

3. The flash memory controller of claim 1, wherein the processor controls the I/O circuit transmitting another set-feature signal, which carries the set-feature command, a different feature address, and different parameter information, to the flash memory device; the different feature address corresponds to a setting of the dummy data portion; the different parameter information comprises a first parameter data, a second parameter data, a third parameter data; the dummy data portion is determined based on a page address if the first parameter data indicates a first logic bit and is determined based on a setting value if the first parameter data indicates a second logic bit; and, the second parameter data and the third parameter data are used to indicate a content of the setting value if the first parameter data indicates the second logic bit.

4. The flash memory controller of claim 1, wherein the processor controls the I/O circuit transmitting a get-feature signal, which carries the set-feature command and the feature address, to the flash memory device, to make the flash memory device transmit the corresponding parameter information previously carried in the set-feature signal back to the flash memory controller.

5. The flash memory controller of claim 1, wherein the processor controls the I/O circuit transmitting a get-feature signal, which carries the set-feature command and the feature address, to the flash memory device, to make the flash memory device transmit the corresponding parameter information previously carried in the set-feature signal back to the flash memory controller.

6. The flash memory controller of claim 1, wherein for performing a read operation the processor controls the I/O circuit sequentially transmitting a read command, a logical column address, a logical row address, and a read execution command to the flash memory device, to make the flash memory device read the full page data from the physical page unit, discard the dummy data portion of the full page data according to the set-feature signal, and transmit the valid data portion of the full page data without sending the dummy data portion of the full page data to the flash memory controller, wherein the valid data portion comprises a user data portion and a parity data portion.

7. The flash memory controller of claim 1, wherein for performing a write operation the processor controls the I/O circuit sequentially transmitting a write command, a logical column address, a logical row address, the valid data portion of the full page data, and a write execution command to the flash memory device, to make the flash memory device generate the dummy data portion according to the set-feature signal and then write the valid data portion and the generated dummy data portion into the physical page unit of the flash memory device.

8. The flash memory controller of claim 1, wherein for performing a read operation the processor controls the I/O circuit further inserting a specific command into a read command sequence of the read operation and transmitting the read command sequence to the flash memory device, to make the flash memory device read the full page data from the physical page unit, discard the dummy data portion of the full page data according to the set-feature signal, and transmit the valid data portion of the full page data without sending the dummy data portion of the full page data to the flash memory controller; and, the specific command is at a position before a read command, at a position between the read command and a logical row address, or at a position between a logical row address and a read execution command.

9. The flash memory controller of claim 1, wherein for performing a write operation the processor controls the I/O circuit further inserting a specific command into a write command sequence of the write operation and transmitting the write command sequence to the flash memory device, to make the flash memory device generate the dummy data portion according to the set-feature signal and then write the valid data portion and the generated dummy data portion into the physical page unit of the flash memory device; and, the specific command is at a position before a write command, at a position between the write command and a logical row address, at a position between a logical row address and a head of the valid data portion, or at a position between a tail of the valid data portion and a write execution command.

10. A method of a flash memory controller to be used in a storage device and coupled to a flash memory device of the storage device through a specific communication interface, comprising:

providing an input/output (I/O) circuit, coupled to the flash memory device through the specific communication interface, for sending commands and data between the flash memory device and a processor; and controlling the I/O circuit using a set-feature signal, which carries a set-feature command, a feature address, and corresponding parameter information, and transmitting the set-feature signal to the flash memory device;

wherein the feature address corresponds to a valid data portion or a dummy data portion following the valid data portion, and both the valid data potion and the dummy data portion are comprised in a full page data which is to be written into a physical page unit of the flash memory device or is to be read out from the physical page unit; the corresponding parameter information is used to record the valid data portion's column address and data length, the dummy data portion's column address and data length, the dummy data portion's column address and the valid data portion's column address, or the dummy data portion's data length and the valid data portion's data length.

* * * * *